(12) United States Patent
Thompson et al.

(10) Patent No.: US 12,425,299 B2
(45) Date of Patent: Sep. 23, 2025

(54) ALERTS FOR AND REMEDIATION OF VIRUS OUTBREAKS IN A DATA NETWORK SECURITY FABRIC

(71) Applicant: Fortinet, Inc., Sunnyvale, CA (US)

(72) Inventors: Jordan Edward Thompson, Vancouver (CA); Jerrod Robert Seger, Port Coquitlam (CA); Mark Derek Westerhof, Port Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 833 days.

(21) Appl. No.: 17/364,365

(22) Filed: Jun. 30, 2021

(65) Prior Publication Data

US 2021/0336985 A1 Oct. 28, 2021

Related U.S. Application Data

(63) Continuation-in-part of application No. 17/219,846, filed on Mar. 31, 2021, which is a continuation-in-part of application No. 17/218,870, filed on Mar. 31, 2021, which is a continuation-in-part of application No. 16/358,433, filed on Mar. 19, 2019, now Pat. No. 11,425,158.

(51) Int. Cl.
*H04L 9/40* (2022.01)
*H04L 41/082* (2022.01)
*H04L 41/0894* (2022.01)

(52) U.S. Cl.
CPC ........ *H04L 41/082* (2013.01); *H04L 63/0236* (2013.01); *H04L 63/1425* (2013.01); *H04L 63/1433* (2013.01); *H04L 63/20* (2013.01); *H04L 41/0894* (2022.05)

(58) Field of Classification Search
CPC .. H04L 63/1433; H04L 63/1425; H04L 63/20
USPC ........................................................ 726/25
See application file for complete search history.

(56) References Cited

U.S. PATENT DOCUMENTS

| | | |
|---|---|---|
| 9,147,086 B1 | 9/2015 | Potlapally |
| 2015/0033340 A1* | 1/2015 | Giokas ................ H04L 63/1433 726/23 |
| 2015/0324186 A1* | 11/2015 | Shin .......................... G06F 8/71 717/170 |
| 2016/0301577 A1 | 10/2016 | Lane |
| 2017/0243009 A1 | 8/2017 | Sejpal et al. |
| 2018/0139205 A1 | 5/2018 | Devaney et al. |
| 2018/0375892 A1* | 12/2018 | Ganor ................. H04L 63/1433 |

* cited by examiner

*Primary Examiner* — Anthony D Brown
(74) *Attorney, Agent, or Firm* — Law Office of Dorian Cartwright; Dorian Cartwright

(57) ABSTRACT

A network gateway interrogates a plurality of network devices to collect security state data and operational state data on a periodic basis. A vulnerability resolution module to automatically uploads a security report and downloads actions (e.g., updates to operating system, configurations or policies) from a cloud vulnerability server corresponding to resolution of the vulnerabilities. A security remediation module can remediate on the network device for protection against at least the specific vulnerability of the at least one the peripheral.

18 Claims, 14 Drawing Sheets

ALERTS FOR AND REMEDIATION OF VIRUS OUTBREAKS IN A DATA NETWORK SECURITY FABRIC

CROSS-REFERENCE TO RELATED APPLICATIONS

This application claims priority under 25 USC 120 as a continuation-in-part of commonly-owned U.S. application Ser. No. 17/219,846, filed on Mar. 31, 2021, entitled PROACTIVE DETECTION OF VULNERABILITIES IN A DATA NETWORK SECURITY FABRIC, which in turn, is a continuation-in-part of commonly-owned U.S. application Ser. No. 17/218,870, filed Mar. 31, 2021, entitled CONTEXTUAL SECURITY RECOMMENDATIONS FOR OPTIMIZATION AND SECURITY BEST PRACTICES IN A DATA NETWORK SECURITY FABRIC, which in turn, is a continuation-in-part of commonly-owned U.S. application Ser. No. 16/358,433, filed Mar. 19, 2019, entitled DETERMINATION OF A SECURITY RATING OF A NETWORK ELEMENT, the contents of each being hereby incorporated by reference in their entirety.

FIELD OF THE INVENTION

The invention relates generally to computer processors, and more specifically, to providing remediations to vulnerabilities based on periodically cached state information concerning the enterprise network.

BACKGROUND

Network security is a burgeoning situation given the larger number of networked devices. Managing security has likewise become more complex along with a growing hierarchy of networked devices within the network topology of enterprise networks. For example, SolarWinds is a vulnerability to devices downstream on a computer network that affects devices upstream. For instance, SolarWinds can enter the enterprise network through vulnerabilities of an access point or a Wi-Fi controller and affect a gateway device upstream.

Problematically, even a trained network administrator can become confused on how to organize remediation or recall specific steps to take for remediation of individual issues. Moreover, conventional operating system update wizards are only concerned with the subject device without regards to the surrounding connected network devices and their operational state.

Therefore, what is needed is a robust technique for providing remediations to vulnerabilities based on periodically cached state information concerning the enterprise network.

SUMMARY

These shortcomings are addressed by the present disclosure of methods, computer program products, and systems for providing remediations to vulnerabilities based on periodically cached state information concerning the enterprise network.

In one embodiment, the network device is a gateway device that centrally interrogating the plurality of network devices to collect security state data and operational state data on a periodic basis. Centrally analyzing cached security state data and the operational state data concerning the enterprise network to identify security recommendations based on vulnerabilities of at least one specific peripheral device connected to the network device, are also collected.

In another embodiment, responsive to a new outbreak, a remediation status of each of the network devices is determined by comparing a current firmware version to a remediation firmware version. Communications can be discontinued in some cases with a network device that is out of compliance including providing instructions to other network devices to stop responding to the network device. However, the security action module continues communications with the network device upon return to compliance.

Advantageously, both network performance and computer hardware performance are improved by improving network security issue identification and remediation processes.

BRIEF DESCRIPTION OF THE DRAWINGS

In the following drawings, like reference numbers are used to refer to like elements. Although the following figures depict various examples of the invention, the invention is not limited to the examples depicted in the figures.

Figure 3A:
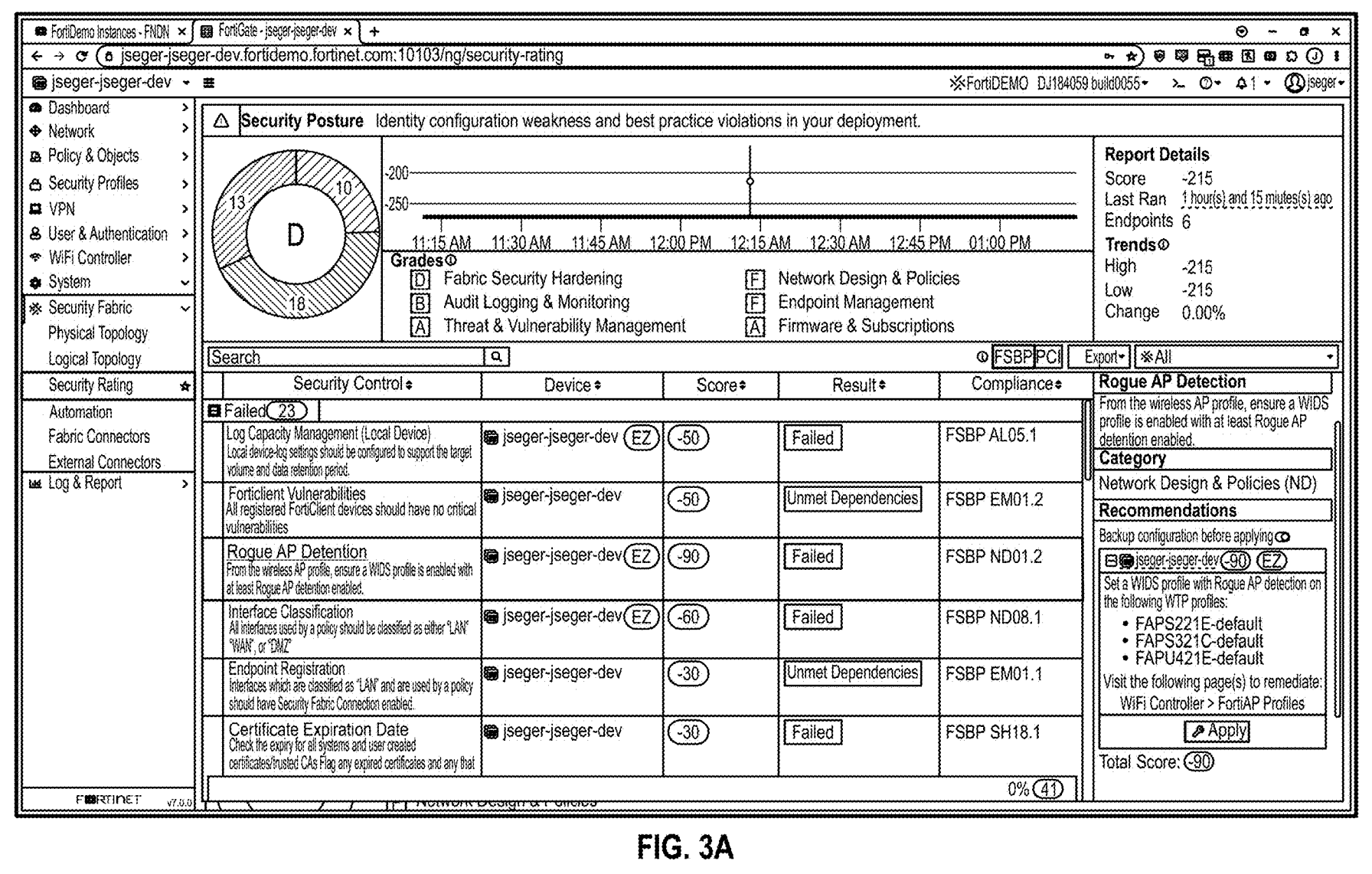
Figure 3B:
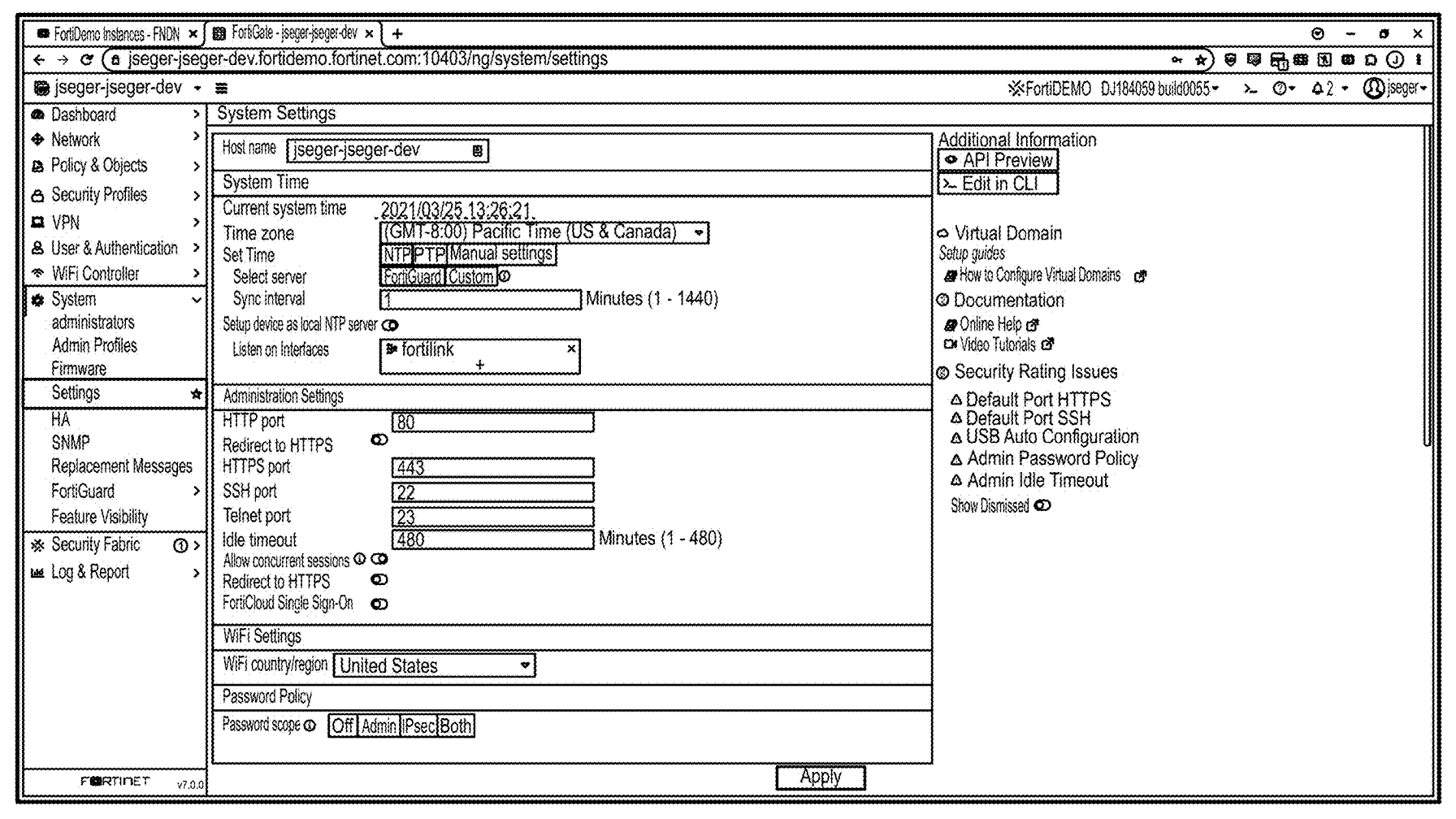
Figure 3D:
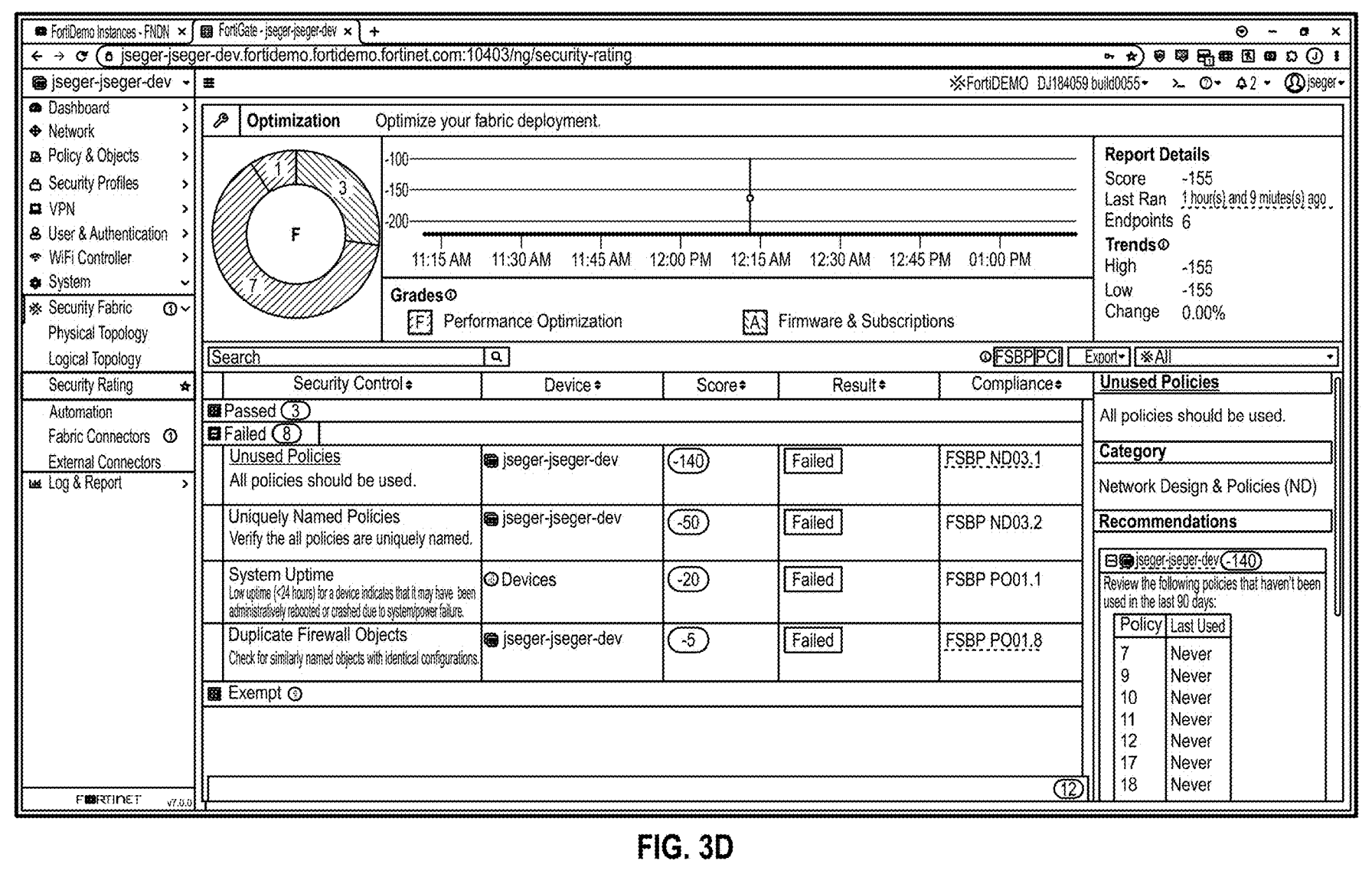
Figure 3F:
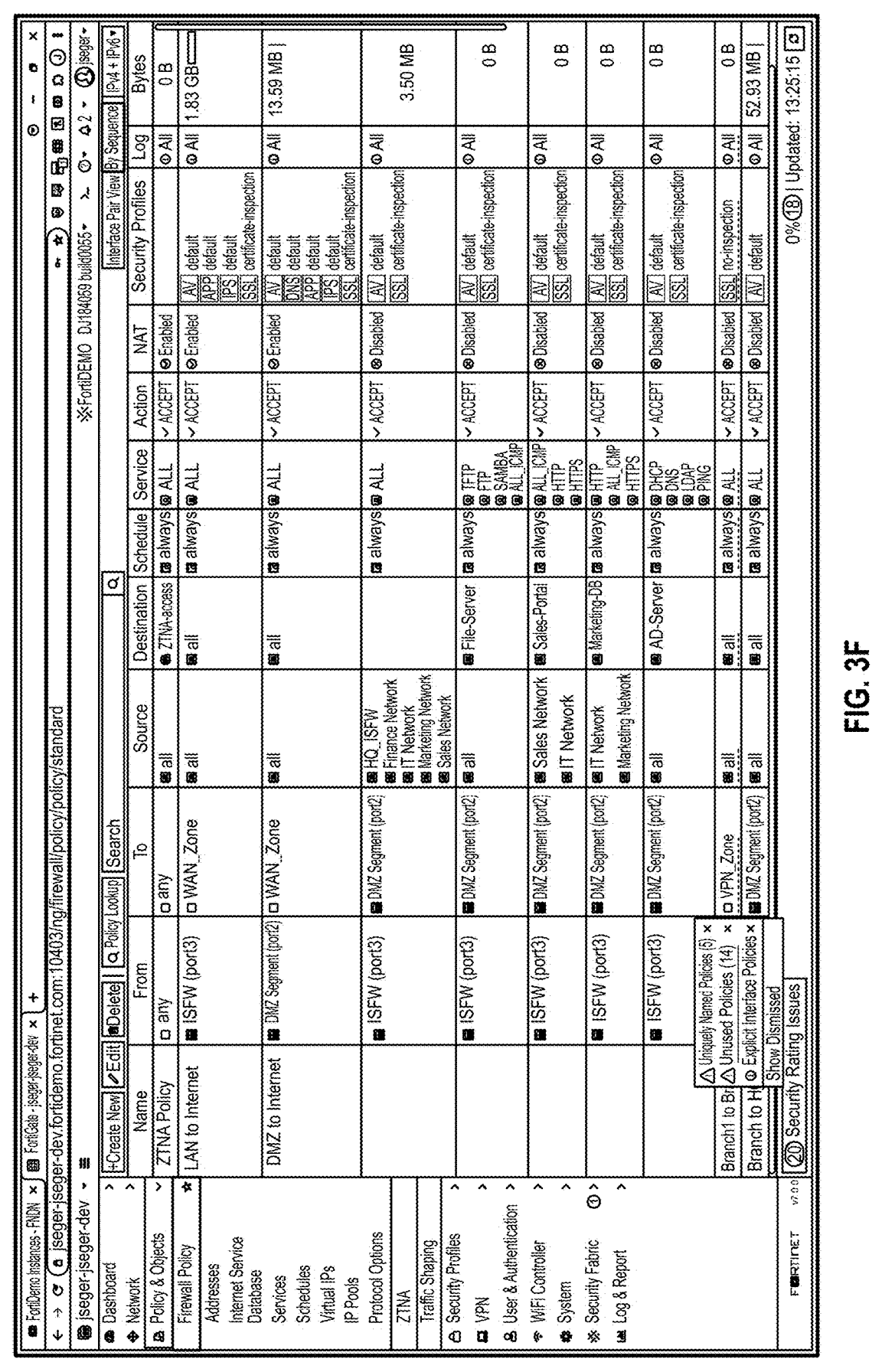
Figure 3G:
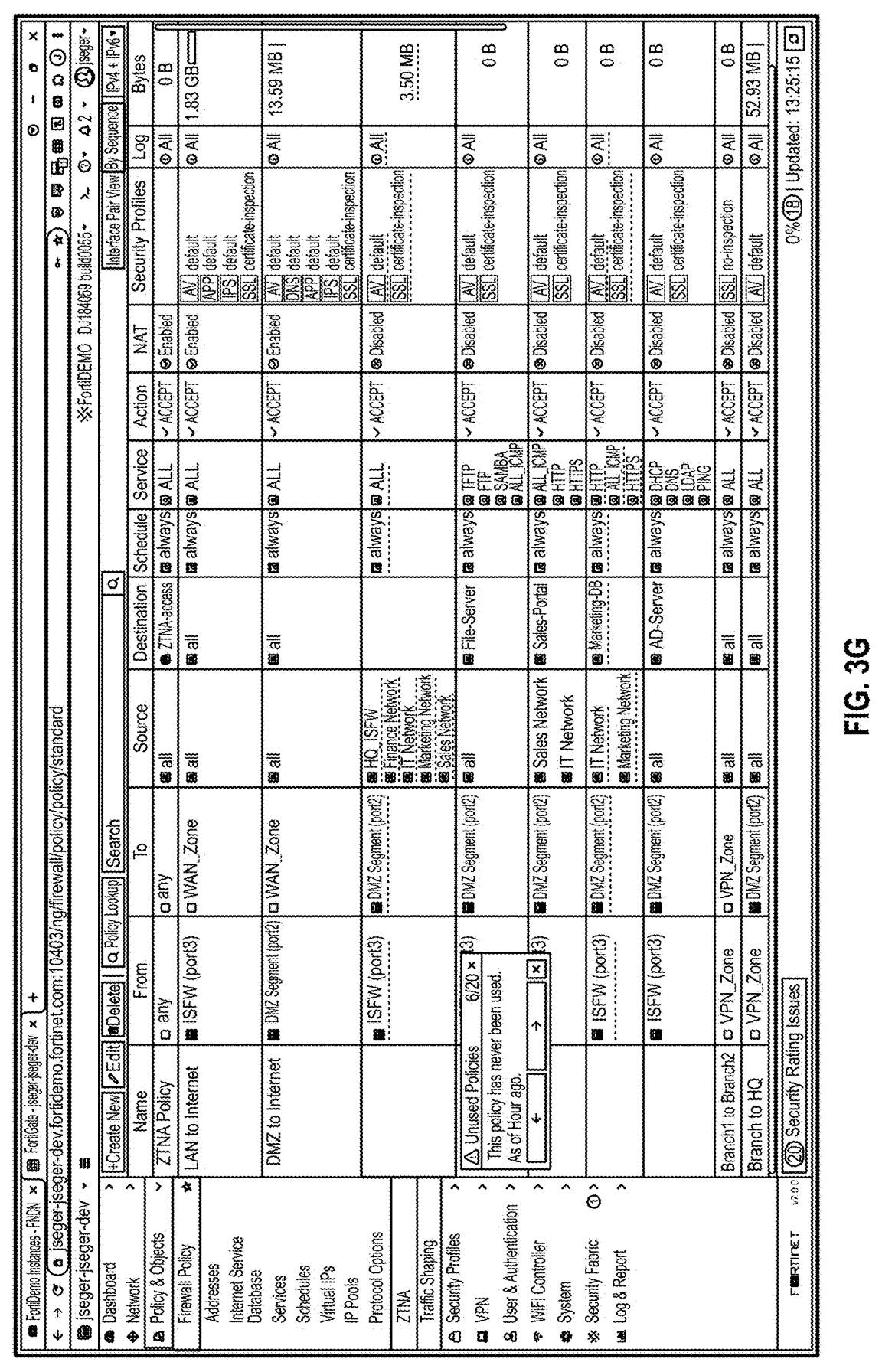
Figure 3H:
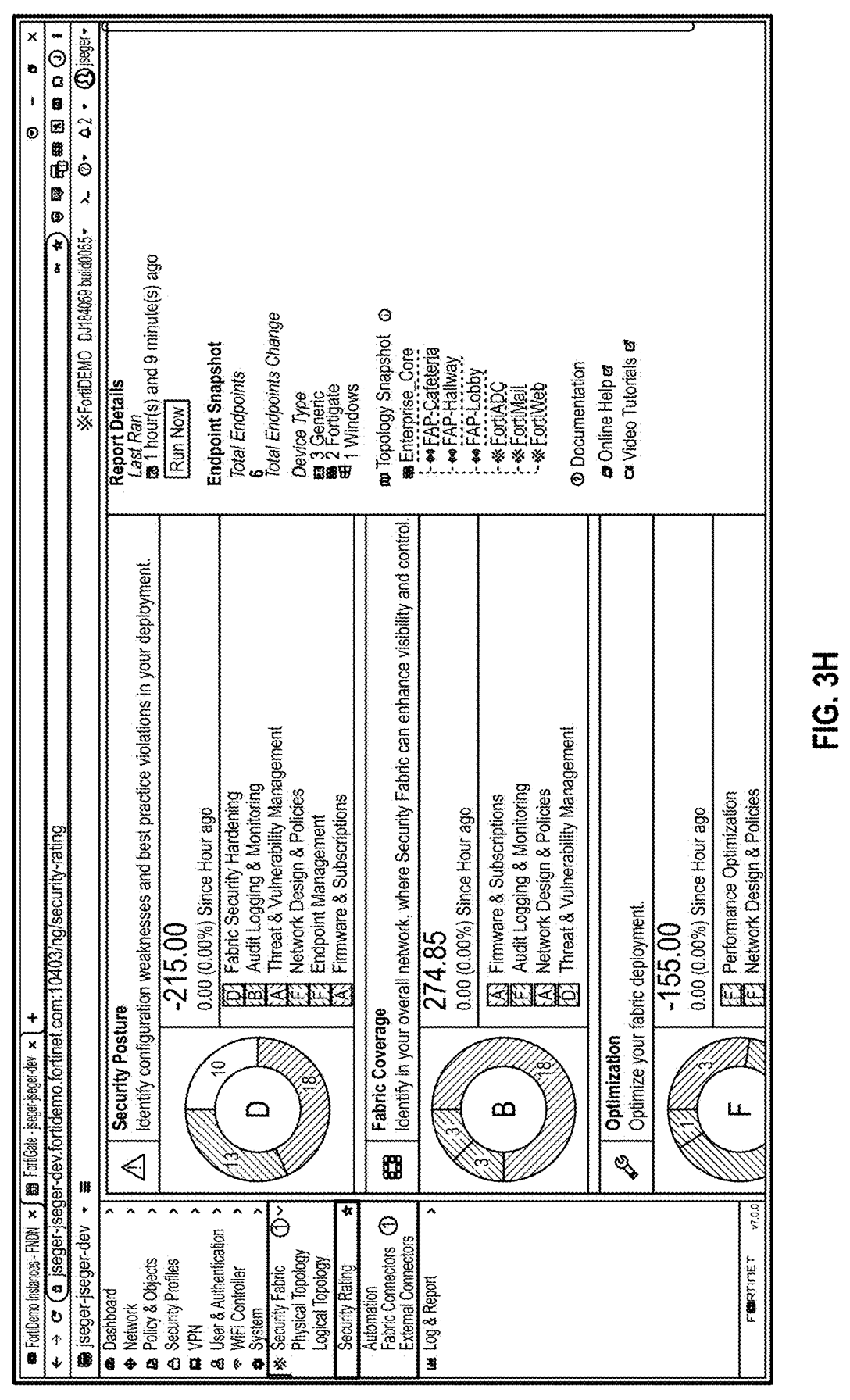

FIGS. 3A-3H are snapshots of a security report GUI from the system of FIG. 1, according to some embodiments.

DETAILED DESCRIPTION

The description below provides methods, computer program products, and systems for providing remediations to vulnerabilities based on periodically cached state information concerning the enterprise network cached state information concerning the plurality of devices. One of ordinary skill in the art will recognize many additional variations made possible by the succinct description of techniques below.

I. Systems for Remediating Enterprise Vulnerabilities (FIGS. 1-2)

Figure 1:
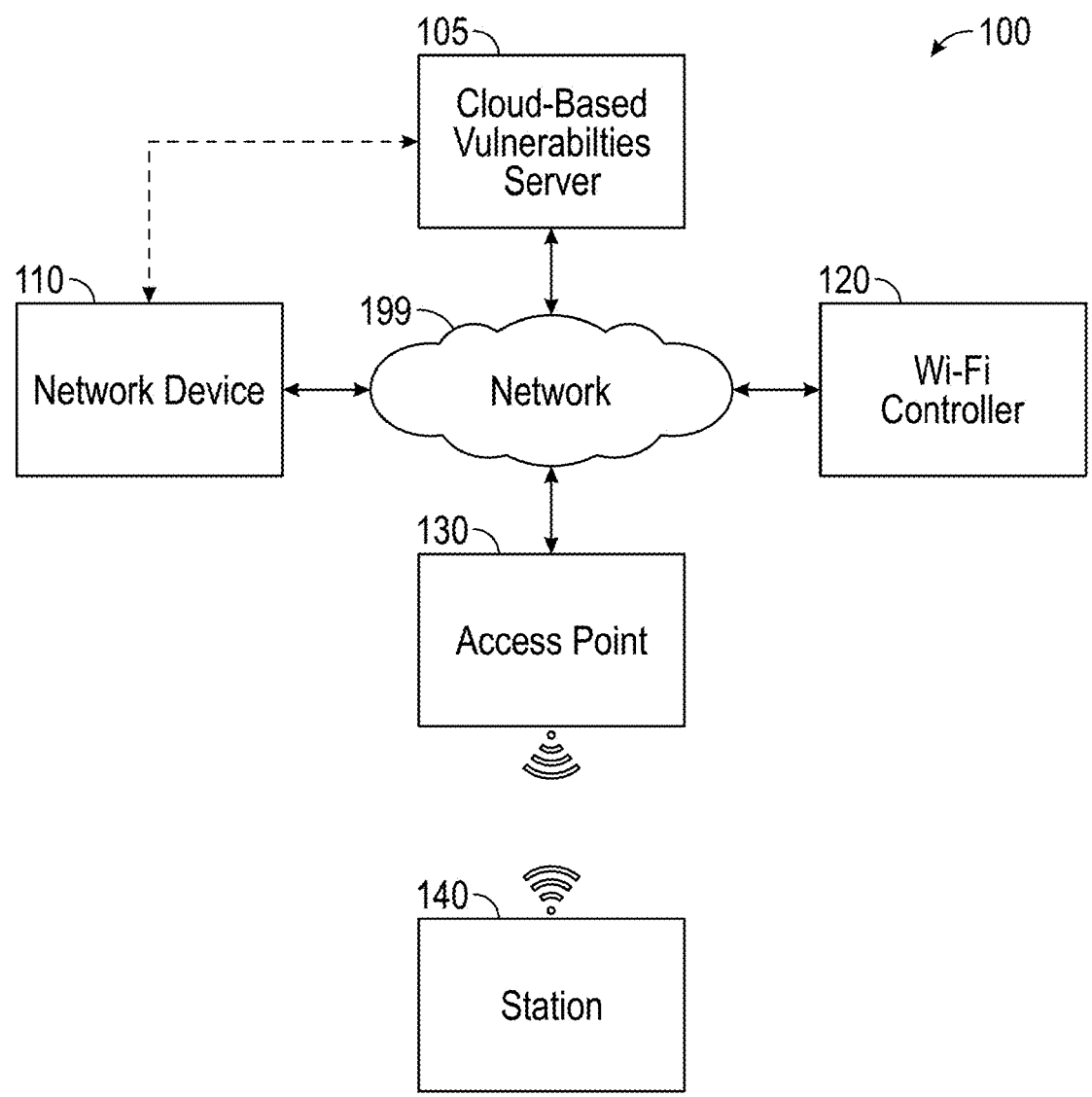
FIG. 1 is a high-level illustration of a system for providing remediations to vulnerabilities based on periodically cached state information concerning the enterprise network, according to an embodiment.
Figure 2:
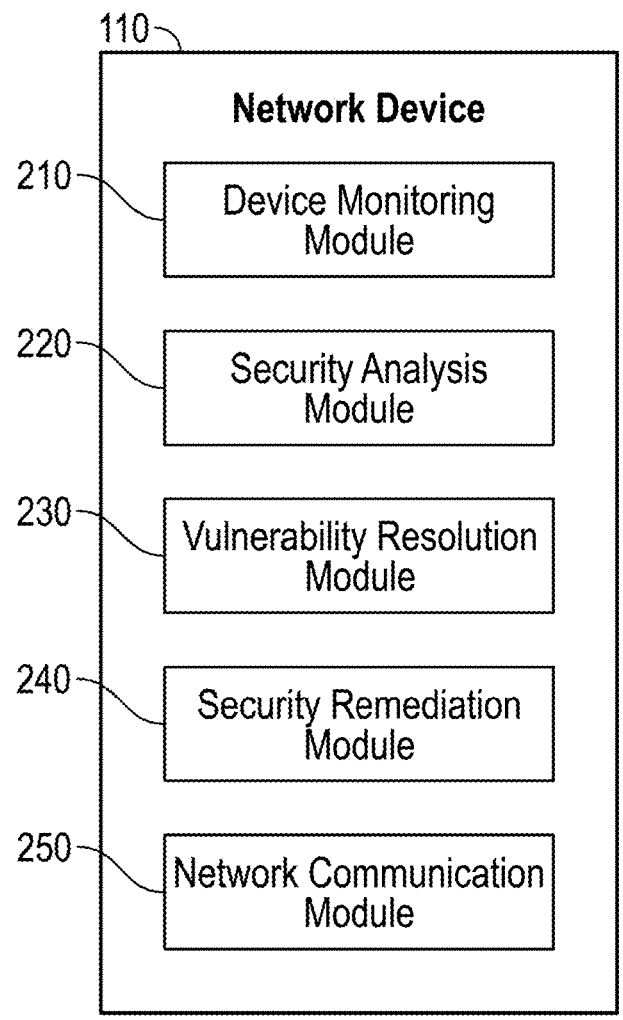
FIG. 2 is a more detailed illustration of a network device of the system of FIG. 1, according to an embodiment.
Figure 3C:
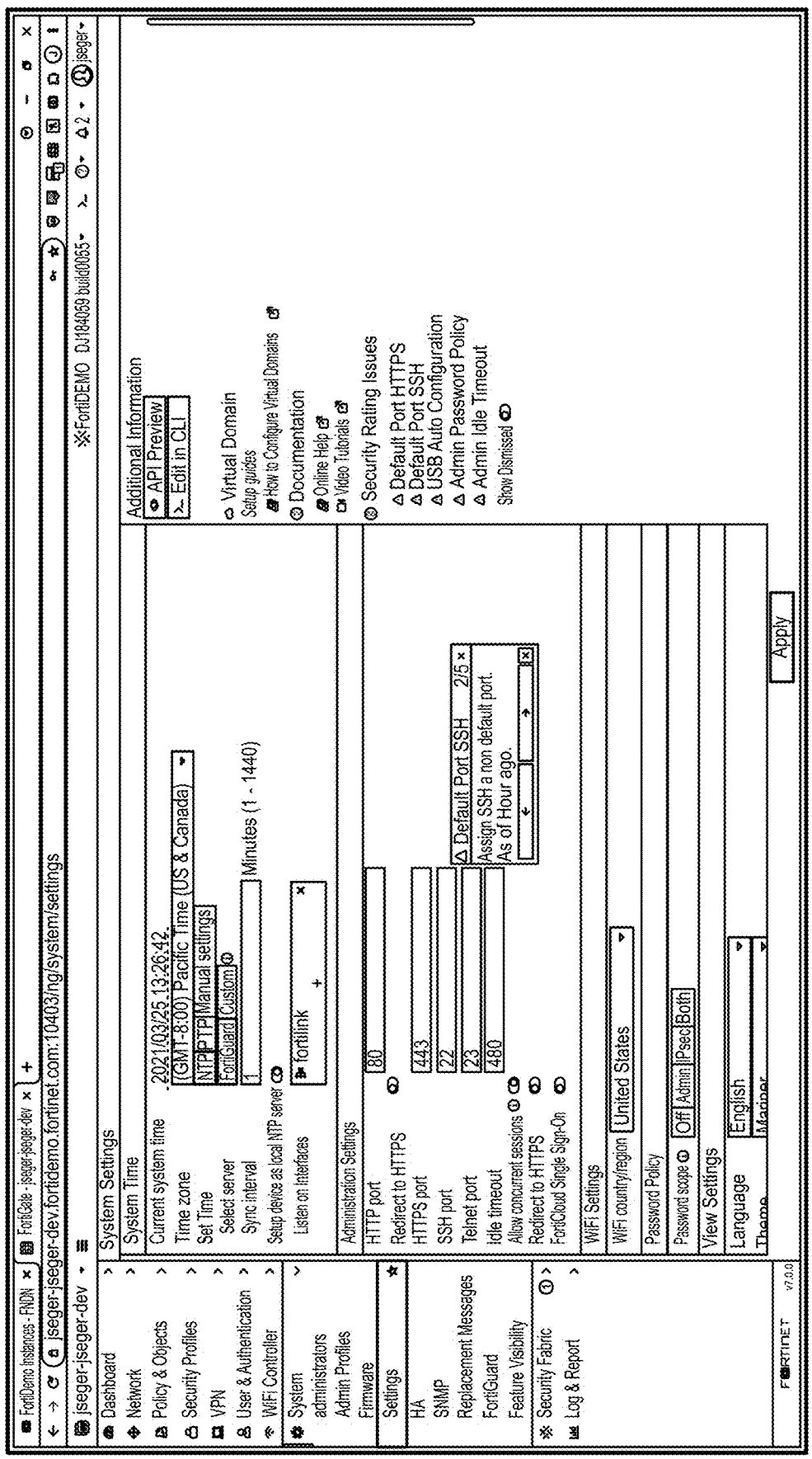
Figure 3E:
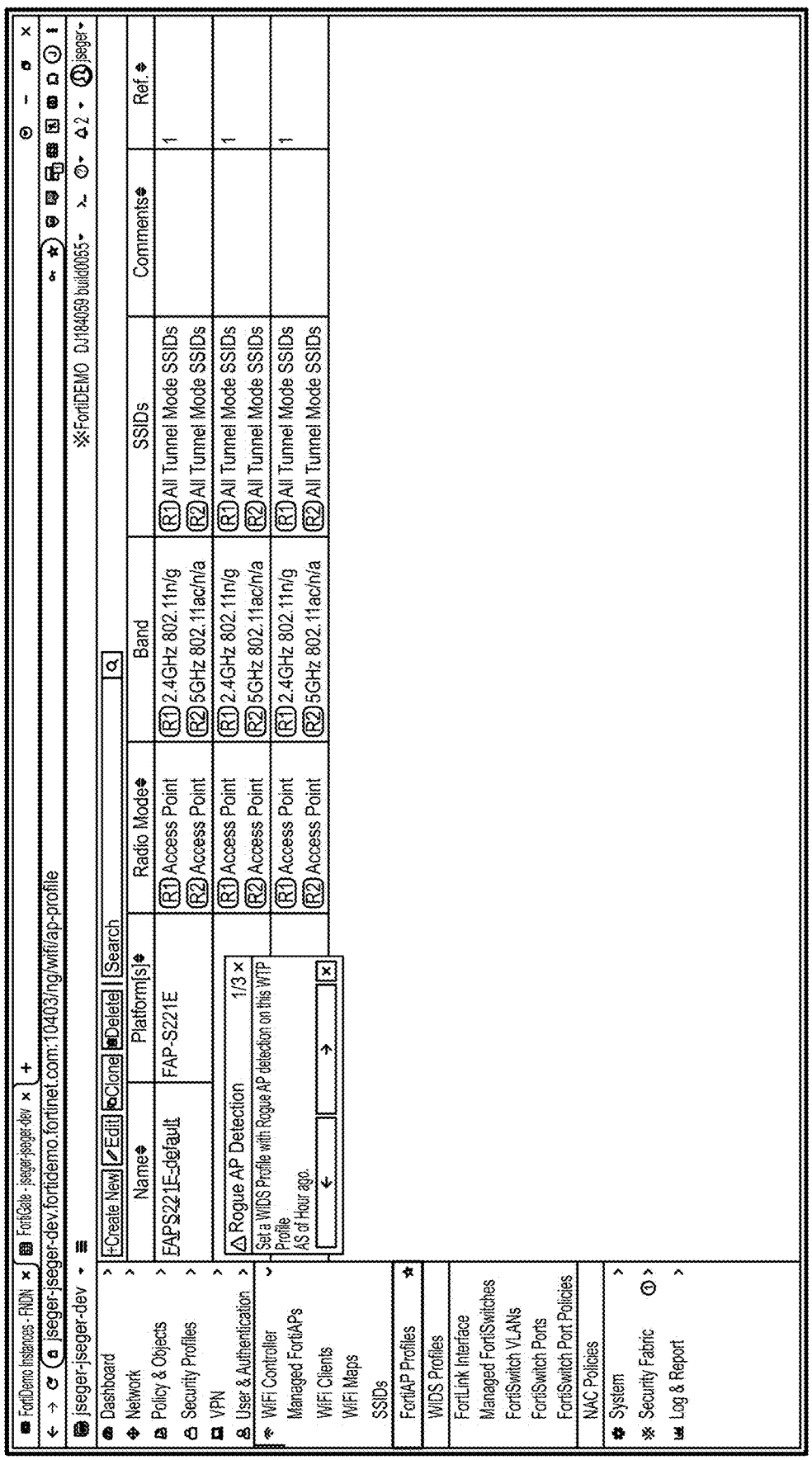

FIG. 1 is a high-level illustration of a system 100 for providing remediations to vulnerabilities based on periodically cached state information concerning the enterprise network, according to an embodiment. The system 100 includes, in part, a cloud-based security recommendations server 105, and on an enterprise network, a network device 110, a Wi-Fi controller 120, an access point 130 and a station 140. Many other embodiments are possible, for example, more or fewer access points, more or fewer stations, and additional components, such as firewalls, routers and switches. The system 100 components can be located locally on a LAN or include remote cloud-based devices, and can be implemented in hardware, software, or a combination similar to the example of FIG. 6.

The components of the system 100 are coupled in communication over a network 199. Preferably, the gateway device 110, the Wi-Fi controller 120 and the access point 130 are connected to the data communication system via hard wire. Other components, such as the station 140 are connected indirectly via wireless connection. The network 199 can be a data communication network such as the Internet, a WAN, a LAN, WLAN, a cellular network (e.g., 3G, 4G, 5G or 6G), or a hybrid of different types of networks. Various data protocols can dictate format for the data packets.

In one embodiment, the network device 110 automatically downloads remediations to close vulnerabilities on itself and, in some cases, peripheral devices that are connected. One implementation updates software patches based for the access point 130 based on vulnerabilities of the station 140. Flash software running on a station can give malware an on ramp to the enterprise network but the access point 130 may not have authority to compel an update. As a result, the access point 130 can protect itself against the vulnerabilities even if Flash software is not running on the machine. Similarly, a firewall device can protect itself against Flash threats and other threats that are outside the data path of the access point 130. Besides software updates, configurations and policies can also be updated, along with other remediations.

In another embodiment, the network device 110 is a gateway device that centrally interrogating the plurality of network devices to collect security state data and operational state data on a periodic basis. Centrally analyzing cached security state data and the operational state data concerning the enterprise network to identify security recommendations based on vulnerabilities of at least one specific peripheral device connected to the network device, are also collected. Responsive to a new outbreak, a remediation status of each of the network devices is determined by comparing a current firmware version to a remediation firmware version. Communications can be discontinued in some cases with a network device that is out of compliance including providing instructions to other network devices to stop responding to the network device. However, the security action module continues communications with the network device upon return to compliance.

In one example, the network device 110 from interrogations and security rating, assesses the SolarWinds outbreak. In this case, a gateway with IPS service should be updated to version 16.981 to block exploit and lateral movement, AV service should be updated to 82.548 to block trojan payload, App Control to 16.989 to block/detect communication to the attack surface, Web Filter service to SaaS to block known IOC, and Botnet C&C service to 16.981 to block known C&C. Similarly, a client (e.g., Threat Hunting service to 6.2 and ZTNA tag to 6.4), SIEM server (e.g., IOC to 0.01727, and Reports & Rules to 5.x or 6.x), and other devices have specific recommendations.

In other operations, the network device 110 can perform firewall duties to protect an enterprise network from external and internal threats (e.g., data packets flowing in and out and viruses running on internal devices). The security data report brings awareness to issues for monitoring. The gateway device 110 can be the FORTIgate device described below, implemented as a single device (see e.g., FIG. 6), as multiple cooperating devices, or as a virtual device. Additional embodiments of the network device 110 are shown below with respect to FIG. 2.

A Wi-Fi controller 120 can report self-configurations, policies, and operational state, along with data for connected peripheral devices, such as the station 130. Other peripheral devices can be upstream, downstream, or network peers (e.g., other access points). In operation, the Wi-Fi controller 120 manages the access point 120 and other devices, and in doing so, collects information and generates information from interactions.

Likewise, an access point 130 provides security and operational state information for itself and connected stations. The station 140 can be upload state information via Wi-Fi. The station 140 can be a mobile client, for instance, a smartphone, a tablet computer, or a smart appliance.

FIG. 2 is a more detailed illustration of the gateway device 110 of the system 100 of FIG. 1. The gateway device 110 includes a device monitoring module 210, a security analysis module 220, a vulnerability resolution module 230, a security remediation module 240 and a network communication module 250. The modules can be implemented in source code stored in non-transitory memory executed by a processor. Alternatively, the modules can be implemented in hardware with microcode. The modules can be singular or representative of functionality spread over multiple components.

The device monitoring module 210 can centrally interrogate the plurality of network devices to collect security state data and operational state data on a periodic basis.

The security analysis module 220 can centrally analyze cached security state data and the operational state data concerning the enterprise network to identify security recommendations based on vulnerabilities of at least one specific peripheral device connected to the network device.

The vulnerability resolution module 230, in an embodiment, automatically uploads at least part of the security report and downloads actions from a cloud vulnerability server corresponding to resolution of the vulnerabilities.

The security remediation module 240 can remediate on the network device for protection against at least the specific vulnerability of the at least one the peripheral.

II. Methods for Remediating Enterprise Vulnerabilities (FIGS. 4-5)

Figure 4:
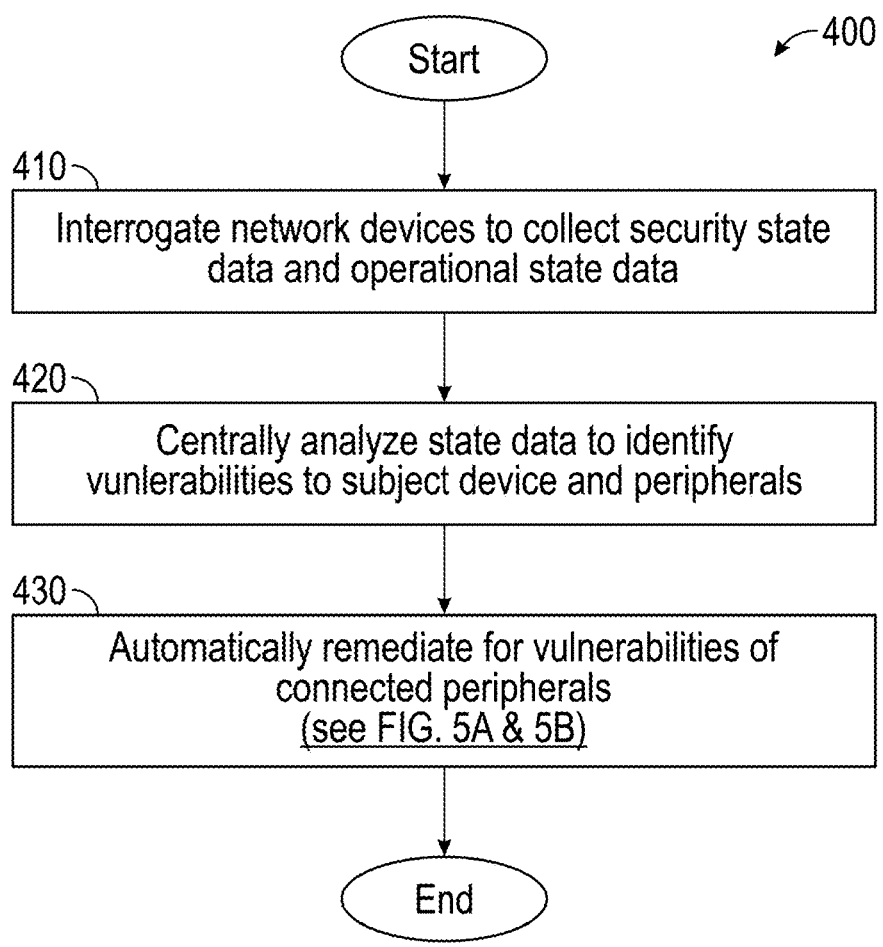
FIG. 4 is a high-level flow diagram illustrating a method for providing remediations to vulnerabilities based on periodically cached state information concerning the enterprise network, according to one preferred embodiment.

FIG. 4 is a high-level flow diagram illustrating a method for taking security actions on a security rating report, according to one embodiment. The method 400 can be implemented, for example, by the system 100 of FIG. 1. The steps are merely representative groupings of functionality, as there can be more or fewer steps, and the steps can be performed in different orders. Many other variations of the method 400 are possible.

At step 410, a device monitoring module to centrally interrogate the plurality of network devices to collect security state data and operational state data on a periodic basis. At step 420, a security analysis module can centrally analyze cached security state data and the operational state data concerning the enterprise network to identify security recommendations based on vulnerabilities of at least one specific peripheral device connected to the network device. At step 430, at least one security recommendation is remediated, as is described further in FIGS. 5A & 5B.

Figure 5A:
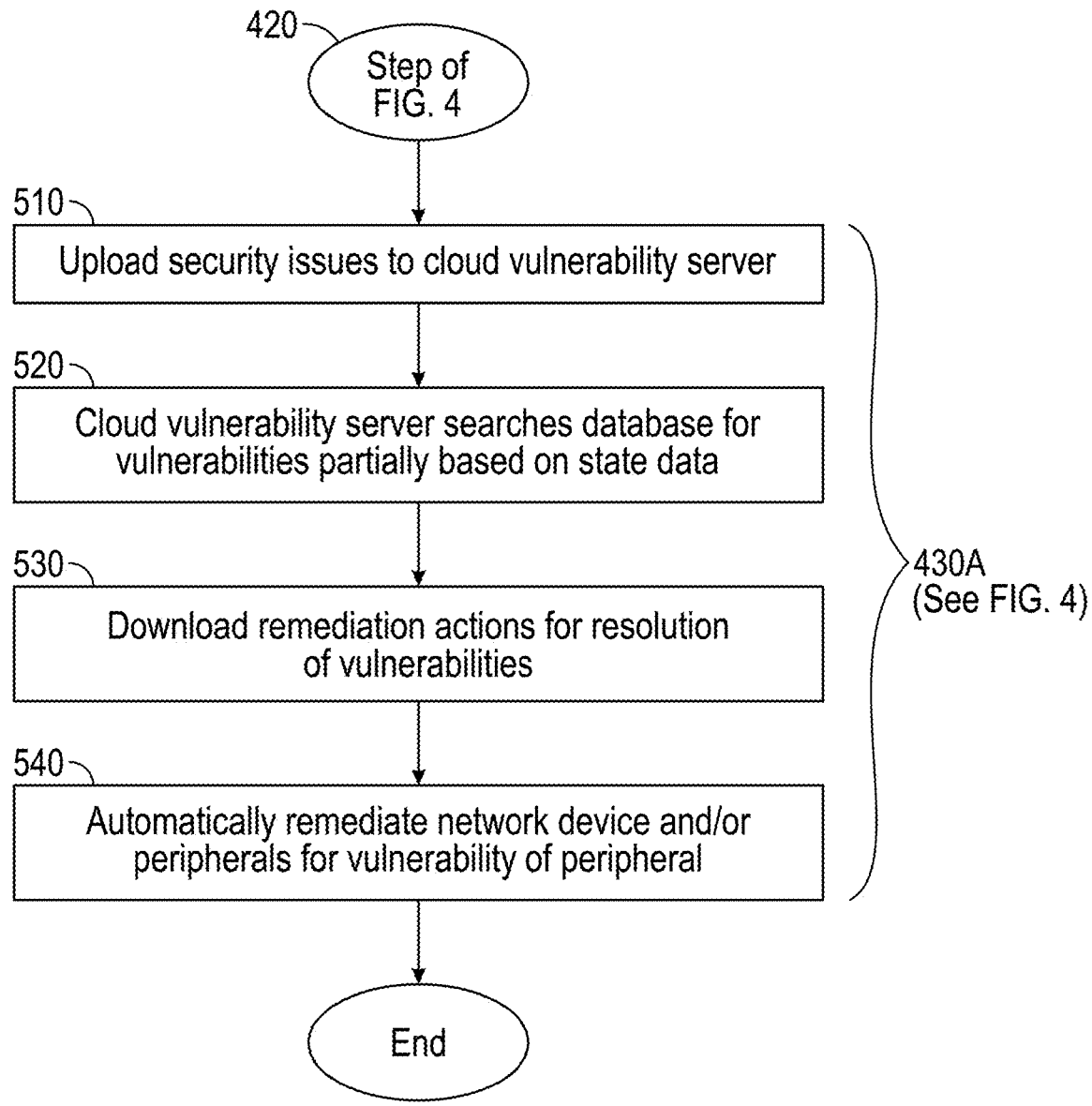
FIGS. 5A & 5B is a more detailed flow diagram illustrating the step of providing contextual security recommendations based on periodically cached state information concerning the plurality of devices for the method of FIG. 4, according to one embodiment.

Turning to FIG. 5A, at step 510, a network device uploads security issues related to its own situation and to connected network devices, to a cloud vulnerability server. For example, a firewall or network gateway device may have authority to reconfigure security settings and policies for all devices on the network. In another example, a Wi-Fi controller may have authority over all managed access points. In yet another example, an access point may have some authority to compel connected stations to make changes or peer access point, such as when there is not Wi-Fi controller in charge.

At step 520, the server determines what changes need to be made by searching a database, and remediation actions are downloaded from a cloud vulnerability server corresponding to resolution of the vulnerabilities, at step 530.

At step 540, the network device vulnerabilities can be automatically remediated for protection against at least the specific vulnerability of the at least one the peripheral. The security action can be taken on the subject device and/or the peripheral connected device.

Figure 5B:
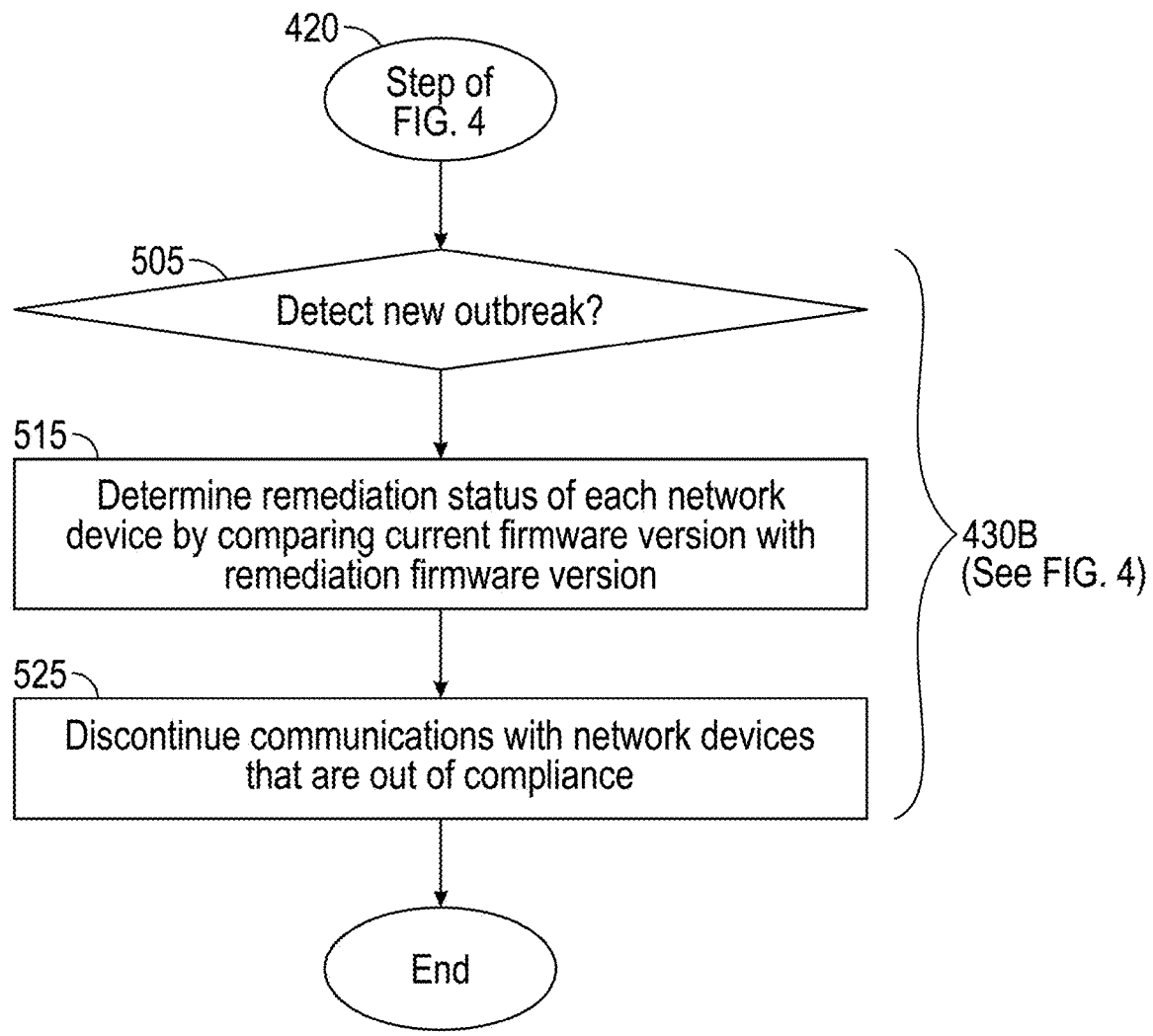

Alternatively, in FIG. 5B, at step 505, the plurality of network devices are centrally interrogated to collect security state data and operational state data on a periodic basis.

At step 515, cached security state data and the operational state data concerning the enterprise network are centrally analyzed to identify security recommendations based on vulnerabilities of at least one specific peripheral device connected to the network device, are also collected. Responsive to a new outbreak, at step 525, a remediation status of each of the network devices is determined by comparing a current firmware version to a remediation firmware version. At step 535, communications can be discontinued in some cases with a network device that is out of compliance including providing instructions to other network devices to stop responding to the network device. However, the security action module continues communications with the network device upon return to compliance.

III. Generic Computing Device (FIG. 6)

Figure 6:
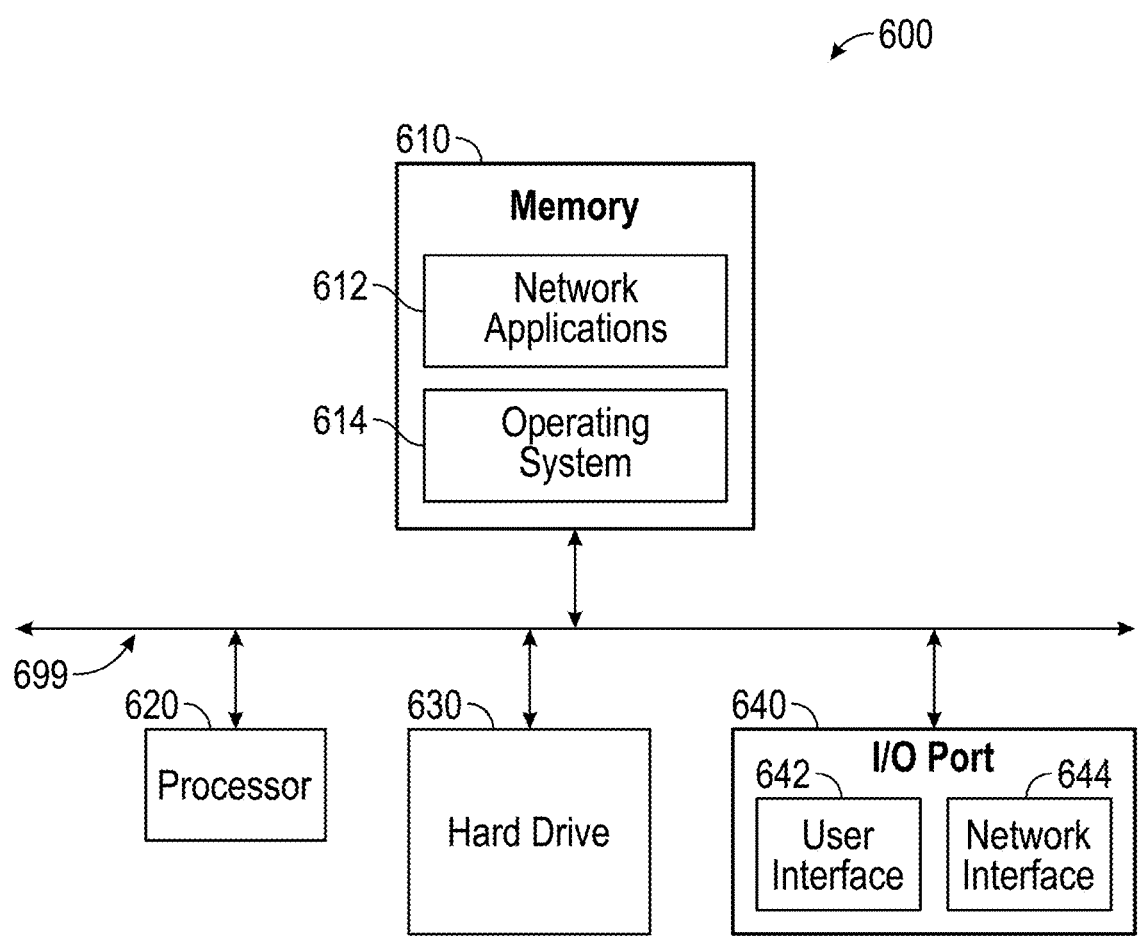
FIG. 6 is an example of a computing environment, according to an embodiment.

FIG. 6 is a block diagram illustrating an example computing device 600 for use in the system 100 of FIG. 1, according to one embodiment. The computing device 600 is implementable for each of the components of the system 100. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network device" or "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A gateway device on an enterprise network that connects with a plurality of peripheral network devices on the enterprise network, for providing remediations to vulnerabilities based on periodically cached state information concerning the enterprise network, the network device comprising:
    a processor;
    a network interface communicatively coupled to the processor and to the enterprise network; and
    a memory, storing:
        a device monitoring module to centrally interrogate the plurality of network devices to collect security state data and operational state data on a periodic basis;
        a security analysis module to centrally analyze cached security state data and the operational state data concerning the enterprise network to identify security recommendations based on vulnerabilities of at least one specific peripheral device connected to the network device;
        a vulnerability mapping module to, responsive to a new outbreak, determine a remediation status of each of the network devices by comparing a current firmware version to a remediation firmware version; and
        a security action module to discontinue communications with a network device that is out of compliance including providing instructions to other network devices to stop responding to the network device,
        wherein the security action module continues communications with the network device upon return to compliance.

2. The gateway device of claim 1, wherein the vulnerability mapping module downloads new signatures associated with the new outbreak.

3. The network device of claim 1, wherein a subsequent security rating takes into account the remediation status of each of the network devices.

4. The gateway device of claim 1, wherein the security action module transmits data to the network device that is out of compliance, wherein the transmitted data furthers compliance.

5. The gateway device of claim 1, wherein the gateway device comprises a firewall device.

6. The gateway device of claim 1, wherein the gateway device comprises a Wi-Fi controller device.

7. A computer-implemented method in a network device on an enterprise network that connects with a plurality of peripheral network devices on the enterprise network, for providing remediations to vulnerabilities based on periodically cached state information concerning the enterprise network, the method comprising the steps of:
    centrally interrogating the plurality of network devices to collect security state data and operational state data on a periodic basis for the network device and at least one specific peripheral device connected to the network device;
    centrally analyzing cached security state data and the operational state data concerning the enterprise network to identify security recommendations based on vulnerabilities of the at least one specific peripheral device connected to the network device;
    responsive to a new outbreak, determining a remediation status of the network device and the at least one specific peripheral device connected to the network device by comparing a current firmware version to a remediation firmware version; and
    responsive to the at least one specific peripheral device connected to the network device being out of compliance for remediation, discontinuing communications with the network device that is out of compliance including providing instructions to other network devices to stop responding to the network device, and
    responsive to the at least one specific peripheral device connected to the network device returning to compliance, continuing communications with the network device.

8. A non-transitory computer-readable media in a network device on an enterprise network that connects with a plurality of peripheral network devices on the enterprise network, when executed by a processor, for performing a method of providing remediations to vulnerabilities based on periodically cached state information concerning the enterprise network, the method comprising the steps of:

centrally interrogating the plurality of network devices to collect security state data and operational state data on a periodic basis for the network device and at least one specific peripheral device connected to the network device;

centrally analyzing cached security state data and the operational state data concerning the enterprise network to identify security recommendations based on vulnerabilities of the at least one specific peripheral device connected to the network device;

responsive to a new outbreak, determining a remediation status of the network device and the at least one specific peripheral device connected to the network device by comparing a current firmware version to a remediation firmware version; and responsive to the at least one peripheral device connected to the network device being out of compliance for remediation, discontinuing communications with the network device that is out of compliance including providing instructions to other network devices to stop responding to the network device, and responsive to the at least one peripheral device connected to the network device returning to compliance, continuing communications with the network device.

9. The method of claim 7, wherein new signatures associated with the new outbreak are downloaded.

10. The method of claim 7, wherein a subsequent security rating takes into account the remediation status of each of the network devices.

11. The method of claim 7, wherein data is transmitted to the network device that is out of compliance, wherein the transmitted data furthers compliance.

12. The method of claim 7, wherein the gateway device comprises a firewall device.

13. The method of claim 7, wherein the gateway device comprises a Wi-Fi controller device.

14. The method of claim 8, wherein new signatures associated with the new outbreak are downloaded.

15. The method of claim 8, wherein a subsequent security rating takes into account the remediation status of each of the network devices.

16. The method of claim 8, wherein data is transmitted to the network device that is out of compliance, wherein the transmitted data furthers compliance.

17. The method of claim 8, wherein the gateway device comprises a firewall device.

18. The method of claim 8, wherein the gateway device comprises a Wi-Fi controller device.

* * * * *